July 18, 1933.                     H. E. IVES                    1,918,705
                             PARALLAX PANORAMAGRAM
                              Filed Dec. 20, 1930

INVENTOR
Herbert E. Ives
BY
Harry Bea Dodson
ATTORNEY

Patented July 18, 1933

1,918,705

UNITED STATES PATENT OFFICE

HERBERT E. IVES, OF MONTCLAIR, NEW JERSEY

PARALLAX PANORAMAGRAM

Application filed December 20, 1930. Serial No. 503,732.

My invention relates to parallax panoramagrams or pictures exhibiting relief throughout a large range of angles and distances of observation, specifically to a form picture or picture structure which promises valuable advantages over any heretofore proposed.

Parallax panoramagrams have been made by several methods, all of which possess the common feature that the constituent picture elements are photographed from a series of slightly separated points of view. In one form an opaque line grating is placed slightly in front of the picture, which consists of a series of lines each composing a minute panoramic view of the subject, and the positives exposed through the clear spaces of the grating combine to form an image which is different for each position of the observer's eyes. Methods for making the photographic records to form parallax panoramagrams are the subject of my copending application, Serial No. 458,303 and will not be here described. The present application has to do solely with a form of panoramagram, which is capable of being produced by several of the methods elsewhere described.

The object of the present invention is to produce a parallax panoramagram which shall have great depth of clear definition, which shall utilize efficiently the light incident upon it, and which shall be capable of use either by transmitted or by reflected light depending upon its exact method of preparation.

In explanation of the value of these features it may be pointed out that these are the principal features in which the parallax panoramagrams which utilize an opaque line grating are deficient. In such panoramagrams, it is necessary to use gratings in which the clear grating spaces shall be only a small fraction of the width of the opaque spaces. As a consequence, the fraction of the incident light transmitted is quite small, in most instances—so small in fact that observation by transmitted light alone is possible. Even so the clear space must be kept so wide that the narrow lines or elements of which the panoramic strips are composed overlap each other considerably with the result that objects much in front of or behind the plane of the picture are not sharply defined.

In the accompanying drawing, which is hereunto annexed and is part of this specification, and which is to a certain extent diagrammatic, I have illustrated a concrete form of my invention, but it should be understood that the drawing is furnished solely for illustrative purposes, and is not to be deemed, in any sense of the word as limiting me to the specific structure therein shown.

Figures 2 and 3 both being upon a scale three times that of Figure 1.

Similar reference numerals refer to similar parts throughout the description.

Figure 1:
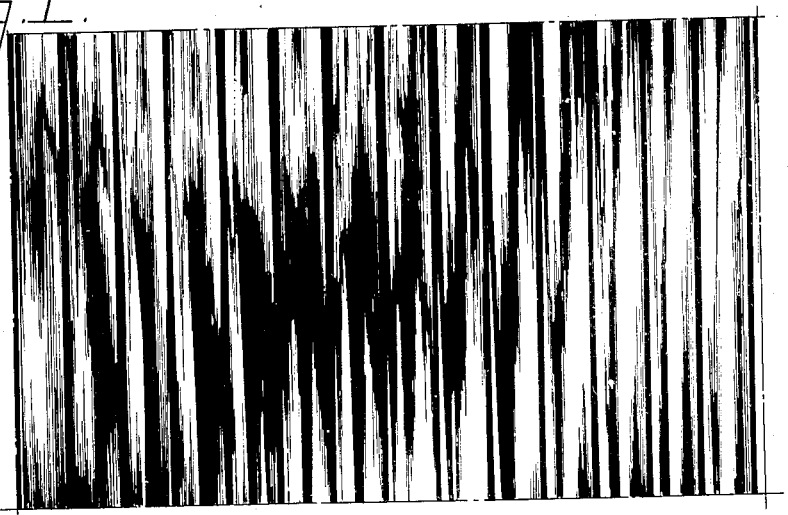
Figure 1 shows a greatly enlarged view of a portion of the new parallax panoramagram, as viewed in a direction perpendicular to its plane.

As shown in the drawing, my invention comprises a sheet 1 of transparent material, preferably celluloid, the sides 2 and 3 of which are provided with a plurality of convex ridges which, as shown in Figure 1, appear as a plurality of rectangles 4.

Each of the rectangles 4 represents greatly enlarged portions of the strip images of which the parallax panoramagrams is composed. In a practical case, the width of these strips would be of the order of 1/50 inch, so that at a normal viewing distance they would be practically indistinguishable. Each of these strip images is composed of a very large number of linear elements $a$, $b$, $c$, parallel to the sides of the strips, the ensemble of such elements forming a minute panorama of the picture presented to the original taking apparatus. It is the function of the structure with which this strip picture is associated to separate out, and present to the eye the corresponding linear elements from each strip which together form the image appropriate to the direction of observation and to exclude the view of all other elements.

Figure 2:
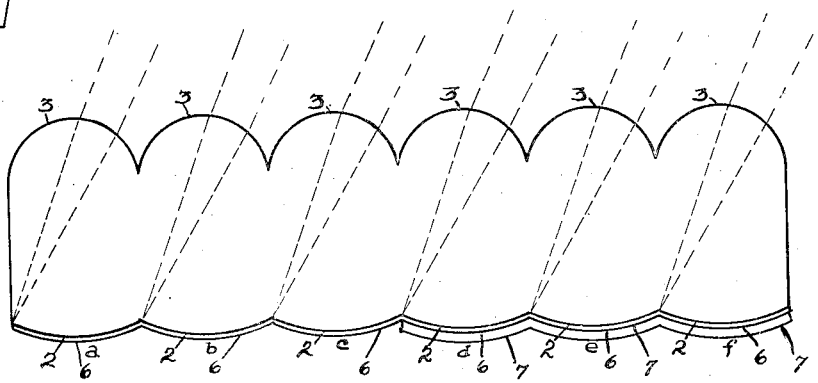
Figure 2 shows an end elevation of an exact form of ridged structure for relief pictures.
Figure 3:
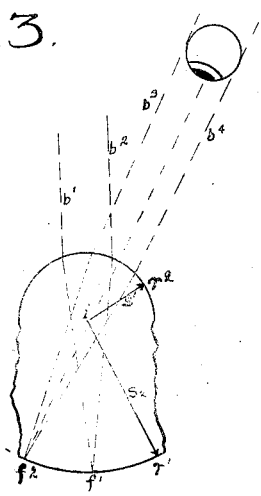
Figure 3 shows an enlarged fragmentary detailed view also in end elevation of one of the elements of the structure shown in Figures 1 and 2.

This function, which is performed by the opaque line grating, in the case of earlier forms of parallax panoramagrams, I perform, in the utilization of the present invention, by the use of the cylindrical lenticular structures 2 and 3, which are illustrated in Figures 2 and 3. In Figure 2, which is a cross section of Figure 1, is shown the new form used in making a relief picture. The sheet of celluloid 1 or other transparent material has formed or impressed upon its sides the convex ridges 2 and 3, which form accurately opposed cylindrical ridges.

One set of the convex ridges has a photographic emulsion 6, on which is impressed, by the methods of exposure, which are the subject of separate applications, Serial Nos. 503,731 and 503,733, the panoramic strip picture shown at $a, b, c$ in Figure 1. By the use of ridges on the back, properly calculated as to curvature, the very desirable characteristic is obtained that the images formed by the front ridges are in sharp focus for all angles of projection, or viewing, whereby the optimum depth of sharp definition in the relief picture is secured. To all practical purposes this means that the ridges 3 are of such curvature as to focus parallel rays upon the inner surface of the ridges 2.

The object of placing the strip images $a, b, c$ on curved surface 2 is to insure that the linear elements shall be in sharp focus no matter what the angle of observation. In order to bring this about it is necessary that an exact relationship be obtained between the curvatures and separation of the two sets of ridges 2 and 3, which is dependent on the refractive index of the material used in the transparent sheet. This relationship is shown in Figure 3, where a single pair of juxtaposed ridges 2 and 3 are shown. Here the front ridge 3 (here indicated as $r^2$) is represented as of circular contour, the radius of curvature as drawn from the axis $i$ being $S'$. A beam of parallel rays $b', b^2$ is brought to a focus at the inner surface of the ridges (here indicated as $f'$) at a distance governed by the refractive index of the sheet material. This distance is that at which the center of the second or rear ridge $r'$ is to be placed with respect to the first $r^2$. Considering now a second beam of parallel rays $b^3$ $b^4$ inclined to the first it is seen that it will similarly be brought to sharp focus at a point $f^2$, equally distant from all points on $r^2$ which lies on a radius $S^2$ from $i$ equal to $f'-s'$. The radii of the two cylindrical ridges are then $s'$, and $f'-s'$, and are both described from the same axis $i$. If the front cylindrical ridges are made with a radius of curvature $s'$, and the medium has a refractive index $n$, simple lens theory gives for the thickness, assuming the rays outside the medium to be parallel, $f=s'$ $(n/n-1)$. The radius of curvature of the rear cylindrical ridges will be $f-s'=s'/n-1$, the front and rear ridges having the same axis. For a refractive index of 1.5, the thickness will be three times and the rear cylinder radius twice the front cylinder radius.

The parallax panoramagrams made according to the above specification may be viewed not only by transmitted light, but also by reflected light, provided the photographic layer 6 is backed by a diffusely reflecting opaque layer 7 (a fragmentary portion only being shown in Figure 1). For in this case, the only rays which can reach the observer's eye C in the direction of a beam such as $b^3$ $b^4$ are those which emanate from an elementary strip image at $f^2$. This elementary image is also only capable of illumination by rays striking the ridge at the same angle as $b^3$ $b^4$, but by virtue of the backing layer 7 being of a diffusely reflecting character it reflects light to the eye which has been incident from all directions above and below the plane in which the eye and the picture element lie. I find that the opaque backing layer is advantageously made of aluminum paint, which because it to some degree directs the light back in the direction of illumination, contributes to enhanced brightness of the picture. The photographic impression must, for reflected light be developed only to a low density because of the double passage of light through it.

Having described my invention, what I regard as new and desire to secure by Letters Patent of the United States is:

1. A relief picture formed of a sheet of transparent material having accurately opposed convex cylindrical ridges on its front and rear surfaces, the opposing cylindrical ridges having the same axis but the radius of the rear ridges being in the proportion to the radius of the front ridges of unity divided by the refractive index of the material minus one, and the rear ridges carrying a photographic layer embodying panoramic strip images.

2. A relief picture formed of a sheet of transparent material having accurately opposed convex cylindrical ridges on its front and rear surfaces, the opposing cylindrical ridges having the same axis but the radius of the rear ridges being in the proportion to the radius of the front ridges of unity divided by the refractive index of the material minus one, the rear ridges carrying a photographic layer embodying panoramic strip images, and a layer of opaque diffusely reflecting material overlying said photographic layer.

HERBERT E. IVES.